US006558723B2

(12) United States Patent
Ekanayake et al.

(10) Patent No.: US 6,558,723 B2
(45) Date of Patent: *May 6, 2003

(54) PRODUCTS COMPRISING AN ISOTHIOCYANATE PRESERVATIVE SYSTEM AND METHODS OF THEIR USE

(75) Inventors: Athula Ekanayake, Cincinnati, OH (US); John Robert Bunger, Union, KY (US); Paul Ralph Bunke, Cincinnati, OH (US)

(73) Assignee: The Procter & Gamble Co., Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/003,880

(22) Filed: Oct. 25, 2001

(65) Prior Publication Data

US 2002/0061352 A1 May 23, 2002

Related U.S. Application Data

(63) Continuation of application No. 09/442,558, filed on Nov. 18, 1999, now Pat. No. 6,361,812.

(51) Int. Cl.⁷ .......................... A23B 4/027; A23L 1/302; A23L 1/304; A23L 2/00
(52) U.S. Cl. .................... 426/321; 426/330.3; 426/335; 426/590; 426/597
(58) Field of Search ............................ 426/321, 330.3, 426/335, 590, 597

(56) References Cited

U.S. PATENT DOCUMENTS

| | | | |
|---|---|---|---|
| 3,725,030 A | 4/1973 | Newallis et al. ................ | 71/76 |
| 3,844,761 A | 10/1974 | Newallis et al. ................ | 71/76 |
| 3,947,570 A | 3/1976 | Penask et al. ................. | 424/54 |
| 3,998,964 A | 12/1976 | Madaus et al. .............. | 424/300 |
| 4,428,933 A | 1/1984 | King .......................... | 424/93 |
| 4,756,919 A | 7/1988 | Cirigiano et al. ........... | 426/330 |
| 4,948,617 A | 8/1990 | Dartey et al. ............... | 426/602 |
| 5,334,373 A | 8/1994 | Sekiyama et al. ............. | 424/40 |
| 5,851,578 A * | 12/1998 | Gandhi ........................ | 426/74 |
| 5,965,755 A | 10/1999 | Sernyk et al. .................. | 554/5 |
| 5,968,567 A | 10/1999 | Fahey et al. .................. | 426/49 |
| 5,985,303 A | 11/1999 | Okada et al. ................ | 424/405 |
| 6,361,812 B1 * | 3/2002 | Ekanayake et al. ......... | 426/321 |

FOREIGN PATENT DOCUMENTS

| | | | |
|---|---|---|---|
| DE | 3622 191 A1 | 7/1988 | ............ A23B/7/14 |
| EP | 0 452 273 A1 | 4/1991 | .......... A61K/35/78 |
| EP | 0 867 125 A1 | 6/1997 | ......... A23L/3/2562 |
| GB | 568009 | 11/1942 | ................ 16628/42 |
| GB | 568011 | 3/1943 | ................ 4413/43 |
| GB | 1 473 037 | 5/1977 | ................ 27718/75 |
| JP | 12511 | 1/1996 | ......... A23L/3/3535 |
| JP | 8-266256 | 10/1996 | ............. A23L/3/36 |
| JP | 10-075751 | * 3/1998 | |
| WO | 94/01121 | 1/1994 | .......... A61K/35/78 |
| WO | 98/33391 | 8/1998 | ............ A23B/4/20 |
| WO | WO 98/50005 | 11/1998 | ............ A61K/7/00 |
| WO | WO 00/54838 | 9/2000 | ............. A61P/3/02 |

OTHER PUBLICATIONS

Sekiyama, Mizukami, Takada, Oosono, & Nishimura, "*Effect of Mustard Extract Vapor on Fungi and Spore–forming Bacteria*" J. Antibact. Antifung. Agents vol. 24, No. 3, pp. 171–178, 1996.
Kanemaru & Miyamoto, "Inhibitory Effects on the Growth of Several Bacteria by Brown Mustard and *Allyl Isothiocyanate*", Nippon Shokuhin Kogyo Gakkaishi, vol. 37, No. 10, 823–829, 1990.
Gomes de Saravia & Gaylarde, "*The Antimicrobial Activity of an Aqueous Extract of Brassica Negra*", International Biodeterioration & Biodegradation 41 (1998) 145–148.
Watanabe & Watanabe, "*Screening, Isolation, and Identification of Food–orginated Compounds Enhancing the Ice–nucleation Activity of Xanthomonas Campestris*", Biosci. Biotech. Biochen, 58 (1), 64–66, 1994.
Brown & Morra, "*Glucosinolate–Containing Plant Tissues as Bioherbicides*", J. Agric. Food Chem. 1995, 43, 3070–3074.
"*Isothiocyannates*", Critical Reviews in Food Science and Nutrition, 39 (3):245–257 (1999).
Clark, "*Allyl Isothiocyanate*", Perfumer & Flavorist, vol. 17, Sep./Oct., 1992, pp. 107–108.
Isshiki, Tokuoka, Mori & Chiba, "*Preliminary Examination of Allyl Isothiocyanate Vapor for Food Preservation*", Biosci. Biotech. Biochem., 56(9), 1476–1477, 1992.
Sekiyama, Mizukami, She, Dong, & Uemura, "*Antimicrobial Activity of Mustard Extract Against Food Poisoning Bacteria*", Jpn. J. Food Microbiol., 11(2), 133–136, 1994.
Tesaki, Tanabe, Ono, Fukushi, Kawabata & Watanabe, "*4–Hydroxy–3–nitrophenylacetic and Sinapic Acids as Antibacterial Compounds from Mustard Seeds*", Biosci, Biotechnol. Biochem., 62 (5), 998–1000, 1998.
Ono, Tesaki, Tanabe & Watanabe, "*6–Methylsulfinyhexyl Isothiocyanate and Its Homologues as Food—orginated Compounds with Antibacterial Activity Against Escherichia coli and Staphylococcus aureus*", Biosci. Biotechnol. Biochem., 62 (2), 363–365, 1998.
Council for Agricultural Science and Technology, "Naturally Occurring Antimicrobials in Food", Task Food Report, No. 132, pp. 31–32, Apr. 1998.

* cited by examiner

*Primary Examiner*—Helen Pratt
(74) *Attorney, Agent, or Firm*—S. Robert Chuey; Kelly McDow-Dunham; Carl J. Roof

(57) ABSTRACT

The present disclosure relates to products, including preservative systems and compositions (e.g., foods, beverages, health care products, personal care products, herbicidal products, and containment devices). The products contain a constituent comprising an isothiocyanate compound. The products may further contain a preservative selected from sorbate preservatives, benzoate preservatives, and mixtures thereof. The present disclosure further relates to methods of preserving products by incorporating the foregoing preservative systems into such products.

27 Claims, No Drawings

PRODUCTS COMPRISING AN ISOTHIOCYANATE PRESERVATIVE SYSTEM AND METHODS OF THEIR USE

CROSS REFERENCE TO RELATED APPLICATION

This is a continuation under 35 U.S.C. §120 of U.S. patent application Ser. No. 09/442,558, filed Nov. 18, 1999, now U.S. Pat. No. 6,361,812.

FIELD OF THE INVENTION

The present invention relates to products, including preservative systems and compositions comprising such preservative systems (e.g., foods, beverages, health care products, personal care products, herbicidal products, and containment devices which incorporate the foregoing preservative system). The products comprise a constituent comprising one or more isothiocyanate compounds. The present invention further relates to methods of preserving products comprising utilizing the foregoing preservative systems.

BACKGROUND OF THE INVENTION

Consumer products can provide a hospitable environment for rapid microbial growth. Such exposure can, and frequently does, result from inadvertent microbial inoculation of the product during manufacturing or packaging. Spoilage microorganisms, for example in food or beverage products, can then rapidly proliferate by feeding on nutrients provided by the product.

Preservatives, such as sorbates, benzoates, organic acids, and combinations thereof have been used in various products, particularly foods and beverages, to provide some degree of microbial inhibition. At levels effective to inhibit microbial growth, some of these preservatives can contribute off-flavors in the product, thus making the product undesirable for its intended purpose. For example, accepted usage levels for potassium sorbate is typically in the range of from about 200 ppm to about 3000 ppm. However, at the higher end of this accepted usage range, potassium sorbate can contribute to off-flavors in the foods or beverages.

Additionally, certain preservative systems are not effective in the presence of fortification components, including various vitamins and minerals. For example, calcium fortification in certain food or beverage products can render the preservative system inactive, thereby failing to inhibit microbial growth. Therefore, wherein nutrient fortification is desirable, expensive preservative components such as dimethyl dicarbonate (DMDC) must be utilized to inhibit microbial growth in the fortified product.

It has been disclosed that oil of mustard, which contains isothiocyanates, exhibits an antibacterial and antimycotic effect in oral therapies and on certain foods. See e.g., Sekiyama et al., U.S. Pat. No. 5,334,373, assigned to Nippon Sanso Corp., issued Aug. 2, 1994; and Madaus et al., U.S. Pat. No. 3,998,964, issued Dec. 21, 1976. However, it has been suggested that mustard oil can irritate the mucous membranes and may not be well tolerated by individuals ingesting the oil. See e.g., Madaus et al. Additionally, mustard oil can exhibit strong characteristic flavors which render the oil unfavorable for use in food or beverage products. Accordingly, mustard oil has not been widely known or widely utilized in the art for its antibacterial and antimycotic effect, particularly in products suitable for ingestion such as food and beverage products.

However, the present inventors have surprisingly discovered that one or more isothiocyanate compounds, optionally in combination with a sorbate and/or benzoate preservative, exhibits a strong antimicrobial effect without imparting off-flavors or offensive odors in the final product. In doing so, the present inventors have discovered a synergistic relationship between the relative effects of each of the preservative components when utilized in combination. Surprisingly, when utilized in combination, each of the preservative components are effective at levels low enough to maintain the organoleptic integrity of the final food or beverage product. The present inventors have further surprisingly discovered that such antimicrobial effect is maintained even in the presence of fortification nutrients such as calcium, thus overcoming the problems associated with currently fortified products. Accordingly, the preservative systems of the present invention are utilized at relatively low levels, provides maintenance of flavor and odor integrity, and are effective against microbial growth even in the presence of fortification nutrients.

SUMMARY OF THE INVENTION

The present invention relates to products comprising the following preservative system:

(a) a constituent comprising one or more isothiocyanate compounds; and (b) a preservative selected from sorbate preservatives, benzoate preservatives, and mixtures thereof.

The present invention further relates to methods of preserving a product comprising incorporating the foregoing preservative system into the product.

The present invention further relates to beverage products comprising:

(a) a constituent comprising one or more isothiocyanate compounds; and (b) a beverage member selected from the group consisting of water, fruit juice, tea solids, milk solids, fruit flavors, botanical flavors, and mixtures thereof.

The present invention further relates to methods of preserving a beverage product comprising incorporating one or more isothiocyanate compounds into the beverage product.

In accordance with the present invention, the products may be preservative systems suitable for incorporation into various compositions requiring an antimicrobial effect. Additionally, the products may be compositions exhibiting an antimicrobial effect including, for example, food products, beverage products (including, e.g., ready-to-drink products and concentrates), health care products (including, e.g., oral care products), personal care products, herbicidal products, and containment devices.

DETAILED DESCRIPTION OF THE INVENTION

The present invention relates to products providing an antimicrobial effect as well as methods of their use.

Publications and patents are referred to throughout this disclosure. All references cited herein are hereby incorporated by reference.

All percentages, ratios, and proportions used herein are by weight unless otherwise specified.

In the description of the invention various embodiments and/or individual features are disclosed. As will be apparent to the ordinarily skilled practitioner all combinations of such embodiments and features are possible and can result in preferred executions of the invention.

The products herein may comprise, consist essentially of, or consist of any of the elements as described herein.

Definition and Usage of Terms

The following is a list of definitions for terms used herein:

As used herein, "alkenyl" is an unsaturated hydrocarbon straight, branched, or cyclic chain radical. Preferably, the alkenyl is a straight or branched chain radical, most preferably straight. Alkenyls have at least one olefinic double bond. Unless otherwise specified, alkenyls have from 2 to about 15 carbon atoms ($C_2$–$C_{15}$); preferably from 2 to about 10 carbon atoms ($C_2$–$C_{10}$); more preferably from 2 to about 8 carbon atoms ($C_2$–$C_8$), even more preferably from about 2 to about 6 carbon atoms ($C_2$–$C_6$), and most preferably from about 2 to about 4 carbon atoms ($C_2$–$C_4$). Non-limiting examples of alkenyls include vinyl, allyl, and butenyl (e.g., 3-butenyl). Alkenyls may be substituted or unsubstituted.

As used herein, "alkoxy" is an oxygen radical having an alkyl, alkenyl, or alkynyl, preferably an alkyl or alkenyl, and most preferably an alkyl substituent. Examples of alkoxy radicals include —O-alkyl and —O-alkenyl. An alkoxy radical may be substituted or unsubstituted.

As used herein, "alkyl" is a saturated hydrocarbon straight, branched, or cyclic chain radical. Preferably, the alkyl is a straight or branched chain radical, most preferably straight. Unless otherwise specified, alkyls have from 1 to about 15 carbon atoms ($C_1$–$C_{15}$); preferably from 1 to about 10 carbon atoms ($C_1$–$C_{10}$); more preferably from 1 to about 6 carbon atoms ($C_1$–$C_6$); and most preferably from 1 to about 4 carbon atoms ($C_1$–$C_4$). Preferred alkyls include, for example, methyl, ethyl, propyl, iso-propyl, and butyl. Alkyls may be substituted or unsubstituted.

As used herein, "alkylaryl" is an alkyl radical substituted with an aryl group or an aryl radical substituted with an alkyl group. Preferred alkylaryl groups include benzyl, phenylethyl, and phenylpropyl. Arylalkyls may be substituted or unsubstituted.

As used herein, "alkynyl" is an unsaturated hydrocarbon straight, branched, or cyclic chain radical. Preferably, the alkynyl is a straight or branched chain radical, most preferably straight. Alkynyls have at least one triple bond. Unless otherwise specified, alkynyls have from 2 to about 15 carbon atoms ($C_2$–$C_{15}$); preferably from 2 to about 10 carbon atoms ($C_2$–$C_{10}$); more preferably from 2 to about 8 carbon atoms ($C_2$–$C_8$), even more preferably from about 2 to about 6 carbon atoms ($C_2$–$C_6$), and most preferably from about 2 to about 4 carbon atoms ($C_2$–$C_4$). Alkynyls may be substituted or unsubstituted.

As used herein, "aryl" is an aromatic ring radical which is either carbocyclic or heterocyclic. Preferred aryl groups include, for example, phenyl, benzyl, tolyl, xylyl, cumenyl, napthyl, biphenyl, thienyl, furyl, pyrrolyl, pyridinyl, pyrazinyl, thiazolyl, pyrimidinyl, quinolinyl, triazolyl, tetrazolyl, benzothiazolyl, benzofuryl, indolyl, indenyl, azulenyl, fluorenyl, anthracenyl, oxazolyl, isoxazolyl, isotriazolyl, imidazolyl, pyraxolyl, oxadiazolyl, indolizinyl, indolyl, isoindolyl, purinyl, quinolizinyl, quinolinyl, isoquinolinyl, cinnolinyl, and the like. Aryls may be substituted or unsubstituted.

As used herein, "essential oil" refers to the set of all the compounds that can be distilled from the plant from which the oil is derived and that contributes to the characteristic aroma of that plant. See e.g., H. McGee, *On Food and Cooking*, Charles Scribner's Sons, p. 154–157 (1984). In accordance with the present invention, the essential oil preferably originates from a glucosinolate compound which is capable of producing an isothiocyanate compound (for example, through the catalytic hydrolysis of one or more glucosinolates by the enzyme myrosinase) wherein the precursor and enzyme containing plant tissue is homogenized, ground, crushed, pressed, or otherwise damaged.

As used herein "precursor" refers to the set of reactants found in, or originating from, a plant, which when reacted in the presence of a catalyst such as an enzyme, produces an essential oil.

As used herein, "PPM" represents "parts per million", as is commonly known in the art.

As used herein, "effective amount of a product" (or constituent, compound, composition, preservative, or the like) means an amount that is effective to exhibit antimicrobial activity, preferably wherein the antimicrobial activity is inhibiting growth of, eliminating, and/or otherwise decreasing the presence of microbials such as, for example, yeast, bacteria, mold, and fungus, preferably yeast and bacteria. Non-limiting examples of such yeast include *Candida tropicalis, Candida albicans, Hansenula anomala, Saccharomyces cerevisiae, Torulaspora delbreuckii, Zygosaccharomyces bailii,* and *Zygosaccharomyces rouxii*. Non-limiting examples of such bacteria including *Bacillus subtilis, Bacillus cereus, Staphylococcus aureus, Staphylococus epidermidis, Escherichia coli, Salmonella typhimurium, Salmonella enteritidis, Vibrio parahaemolyticus,* and *Pseudomonas aeruginosa*. Non-limiting examples of such mold include *Aspergillus niger, Aspergillus flavus, Penicillium islandicum, Penicillium citrinum, Penicillium chrysogenum, Fusarium oxysporum, Fusarium graminearum, Fusarium solani, Alternaria alternata,* and *Mucor racemosus*.

As defined above and as used herein, substituent groups (e.g., alkyl, alkenyl, alkynyl, aryl, and alkylaryl) may themselves be substituted. Such substitution may be with one or more substituents. Such substituents include those listed in C. Hansch and A. Leo, *Substituent Constants for Correlation Analysis in Chemistry and Biology* (1979). Preferred substituents include, for example, alkyl, alkenyl, alkoxy, aryl, hydroxy (i.e., —OH), oxo (i.e., doubly-bonded oxygen), nitro (i.e., —$NO_2$), amino (i.e., —$NH_2$), cyano (i.e., —C≢N), halo (i.e., chloro, bromo, fluoro, iodo), thiol (i.e., —SH), thioxo (i.e., doubly-bonded sulfur), alkoxy (i.e., —O-alkyl), alkylthio (i.e., —S-alkyl), sulfoxy (i.e., —S=O (which is also depicted as —S(O)), and sulfone (i.e., —S(O)$_2$).

Products of the Present Invention

The present invention relates to products comprising the following preservative system:

(a) a constituent comprising one or more isothiocyanate compounds; and (b) a preservative selected from sorbate preservatives, benzoate preservatives, and mixtures thereof. The present invention further relates to methods of preserving a product comprising incorporating the foregoing preservative system into the product.

The present invention further relates to beverage products comprising:

(a) a constituent comprising one or more isothiocyanate compounds; and (b) a beverage member selected from the group consisting of water, fruit juice, tea solids, milk solids, fruit flavors, botanical flavors, and mixtures thereof. Such beverage products optionally, and preferably, further comprise a preservative selected from the group consisting of sorbate preservatives, benzoate preservatives, and mixtures thereof. The present invention further relates to methods of preserving a beverage product comprising incorporating one or more isothiocyanate compounds into the beverage product.

As used herein, the products may be, but are not limited to, preservative systems or any compositions (e.g., foods, beverages, health care products, personal care products, herbicidal products, and containment devices) in which an antimicrobial effect is desirable. Preferably, the products are food or beverage products, most preferably beverage products. As used herein, the term "antimicrobial effect" means that the product inhibits growth of, eliminates, and/or otherwise decreases the presence of microbials such as, for example, yeast, bacteria, mold, and/or fungus, preferably yeast and/or bacteria.

The present inventors have surprisingly discovered that an isothiocyanate compound, in combination with a sorbate or benzoate preservative (such combination being optional but preferable for beverage products), exhibits a strong antimicrobial effect without imparting off-flavors or offensive odors in the final product. In doing so, the present inventors have discovered a synergistic relationship between the relative effects of each of the preservative components when utilized in combination. Surprisingly, when utilized in combination, each the preservative components are effective at levels low enough to maintain the organoleptic integrity of the final food or beverage product.

Additionally, the present inventors have surprisingly discovered that one or more isothiocyanate compounds, together with a beverage member selected from water, fruit juice, tea solids, milk solids, fruit flavors, botanical flavors, and mixtures thereof, provides an antimicrobial effect at levels which do not impart off-flavors or offensive odors.

Constituent Comprising the Isothiocyanate Compound

In accordance with the present invention, the products comprise a constituent comprising one or more isothiocyanate compounds (i.e., a compound bearing a —N=C=S moiety), preferably one isothiocyanate compound.

The present inventors have discovered that relatively low levels of the isothiocyanate compound produces the desired antimicrobial effect in the present products and methods. Preferably, the isothiocyanate compound is present in the product at a concentration (i.e., the total concentration of all isothiocyanate compounds comprising the product) of less than about 75 ppm, more preferably less than about 30 ppm, still more preferably less than about 20 ppm, even more preferably less than about 15 ppm, and most preferably less than about 10 ppm.

Even further, the present inventors have surprisingly discovered that the isothiocyanate compound exhibits a synergistic antimicrobial effect in combination with a sorbate or benzoate preservative utilized in the present invention (such combination being optional for beverage products), particularly wherein the isothiocyanate compound and the sorbate or benzoate preservative are utilized in the products and methods at low levels. This synergistic effect is a surprising discovery which allows the use of isothiocyanate compounds, which are known to exhibit unpleasant tastes and smells, in products such as food and beverage products.

The ordinarily skilled artisan will readily understand that, from an organoleptic perspective, more isothiocyanate compound can be tolerated in products intended for ingestion which possess intense flavors, e.g., tomato juice or spicy beverages (e.g., V8® juice). Conversely, less isothiocyanate compound can be organoleptically tolerated in products intended for ingestion which possess less intense flavors, e.g., citrus juices.

Any compound bearing a —N=C=S moiety may be utilized in the present invention. Preferably, the isothiocyanate compound has a molecular weight of less than about 500, preferably less than about 400, more preferably less than about 300, and most preferably less than about 200.

Preferably, at least one isothiocyanate compound is non-volatile. As used herein, the term "non-volatile" means that the respective isothiocyanate is not capable of steam distillation at ambient pressure.

Preferably, at least one of the isothiocyanate compounds utilized in the present products (and most preferably each isothiocyanate compound, independently), has the structure:

wherein R is selected from the group consisting of alkyl, alkenyl, alkynyl, aryl, and alkylaryl. As has been stated herein above, substituent groups (here, R) may be substituted or unsubstituted; the terms "alkyl", "alkenyl", "alkynyl", "aryl", and "alkylaryl" should each be construed to include both substituted and unsubstituted. Non-limiting examples of substituent groups include alkyl, alkenyl, alkoxy, aryl, hydroxy (i.e., —OH), oxo (i.e., doubly-bonded oxygen), nitro (i.e., —NO$_2$), amino (i.e., —NH$_2$), cyano (i.e., —C≢N), halo (i.e., chloro, bromo, fluoro, iodo), thiol (i.e., —SH), thioxo (i.e., doubly-bonded sulfur), alkoxy (i.e., —O-alkyl), alkylthio (i.e., —S—alkyl), sulfoxy (i.e., —S=O (which is also depicted as —S(O)), and sulfone (i.e., —S(O)$_2$).

Non-limiting examples of isothiocyanate compounds include:

(a) allyl isothiocyanate (which may be synthetically obtained or alternatively naturally obtained from, for example, horseradish, mustard (particularly black mustard), turnip, cabbage, brussels sprout, kale, collards, and cauliflower), (b) 3-butenyl isothiocyanate (which may be synthetically obtained or alternatively naturally obtained from, for example, cabbage, horseradish, mustard, cole crops, turnip, and rutabaga), (c) benzyl isothiocyanate (which may be synthetically obtained or alternatively naturally obtained from, for example, cress, radish, horseradish, and nasturtium), (d) 2-butyl isothiocyanate (which may be synthetically obtained or alternatively naturally obtained from, for example, horseradish, cabbage, brussels sprout, cauliflower, mustard, and spinach), (e) p-hydroxybenzyl isothiocyanate (which may be synthetically obtained or alternatively naturally obtained from, for example, mustard (particularly white mustard) and charlock), (f) methyl isothiocyanate (which may be synthetically obtained or alternatively naturally obtained from, for example, cabbage, cauliflower, brussels sprout, horseradish, and radish), (g) 4-methylthio-3-butenyl isothiocyanate (which may be synthetically obtained or alternatively naturally obtained from, for example, radish), (h) 4-pentenyl isothiocyanate (which may be synthetically obtained or alternatively naturally obtained from, for example, horseradish, mustard, turnip, rutabaga, cress, and radish), (i) 2-phenylethyl isothiocyanate (which may be synthetically obtained or alternatively naturally obtained from, for example, mustard, cabbage, horseradish, watercress, turnip, rapeseed), (j) phenyl isothiocyanate (which may be synthetically obtained or alternatively naturally obtained from, for example, mustard, spinach, and horseradish), (k) 6-methylsulfinylhexyl isothiocyanate (which may be synthetically obtained or alternatively naturally obtained from, for example, wasabi), (l) 3-methylsulfinylpropyl isothiocyanate (which may be synthetically obtained or alternatively naturally obtained from, for example, turnip), (m) isopropyl isothiocyanate (which may be synthetically obtained or alternatively naturally obtained from, for example, cabbage), (n) 3-methylthioalkyl isothiocyanate (which may be synthetically obtained or alternatively naturally obtained from, for example, cabbage), (o) 3-methylsulfonylpropyl isothiocyanate, (p) 2-hydroxy-3-butenyl isothiocyanate, (q) sec-butyl isothiocyanate (which may be synthetically obtained or alternatively naturally obtained from, for example, cress), (r) 4-methylthiobutyl isothiocyanate (which may be synthetically obtained or alternatively naturally obtained from, for example, rapeseed), (s) 4-methylpentyl isothiocyanate (which may be synthetically obtained or alternatively naturally obtained from, for example, rapeseed), (t) 2-hydroxy-4-pentenyl isothiocyanate (which may be synthetically obtained or alternatively naturally obtained from, for example, rapeseed), (u) 5-methylthiopentyl isothiocyanate (which may be synthetically obtained or alternatively naturally obtained from, for example, rapeseed), (v) 3-indolylmethyl isothiocyanate (which may be synthetically obtained or alternatively naturally obtained from, for example, rapeseed), (w) 4-hydroxy-3-indolylmethyl isothiocyanate (which may be synthetically obtained or alternatively naturally obtained from, for example, rapeseed), (x) 1-methoxy-3-indolylmethyl isothiocyanate (which may be synthetically obtained or alternatively naturally obtained from, for example, rapeseed), and (y) 4-methoxy-3-indolylmethyl isothiocyanate (which may be synthetically obtained or alternatively naturally obtained from, for example, rapeseed).

Preferred among these isothiocyanate compounds include allyl isothiocyanate, 3-butenyl isothiocyanate, 2-butyl isothiocyanate, p-hydroxybenzyl isothiocyanate, 4-methylthio-3-butenyl isothiocyanate, 4-pentenyl isothiocyanate, 2-phenylethyl isothiocyanate, and phenyl isothiocyanate. Even more preferred among these isothiocyanate compounds include allyl isothiocyanate, 3-butenyl isothiocyanate, 2-butyl isothiocyanate, p-hydroxybenzyl isothiocyanate, and 2-phenylethyl isothiocyanate. Still more preferred among these isothiocyanate compounds include allyl isothiocyanate, 3-butenyl isothiocyanate, and p-hydroxybenzyl isothiocyanate. The most preferred isothiocyanate compound for use in the present invention is p-hydroxybenzyl isothiocyanate. Modes of natural and synthetic preparation of isothiocyanate compounds are set forth herein below.

Non-limiting examples of other isothiocyanate compounds which may be utilized in the products and methods of the present invention include 1-adamantyl isothiocyanate; 1-naphthyl isothiocyanate; 2,4,6-trimethylphenylisothiocyanate; 2,4,6-trichlorophenyl isothiocyanate; 2,4-dichlorophenyl isothiocyanate; 2,4-dimethoxyphenyl isothiocyanate; 2,4-xylyl isothiocyanate; 2,5-dichlorophenyl isothiocyanate; 2,5-difluorophenyl isothiocyanate; 2,5-dimethoxyphenyl isothiocyanate; 2,6-difluorophenyl isothiocyanate; 2,6-dimethylphenyl isothiocyanate; 2-(methylthio)phenyl isothiocyanate; 2-(trifluoromethyl)phenyl isothiocyanate; 2-bromophenyl isothiocyanate; 2-chloro-4-nitrophenyl isothiocyanate; 2-chloro-5-(trifluoromethyl)phenyl isothiocyanate; 2-chloroethyl isothiocyanate; 2-chlorophenyl isothiocyanate; 2-ethylphenyl isothiocyanate; 2-fluorophenyl isothiocyanate; 2-iodophenyl isothiocyanate; 2-methoxy-4-nitrophenyl isothiocyanate; 2-methoxy-5-methylphenyl isothiocyanate; 2-methoxyphenyl isothiocyanate; 2-napthyl isothiocyanate; 2-phenethyl isothiocyanate; 2-phenylethyl isothiocyanate; phenethyl isothiocyanate; 3,3,5-trimethylcycohexyl isothiocyanate; 3,4,5-trimethoxyphenyl isothiocyanate; 3,4-dichlorophenyl isothiocyanate; 3,5-bis(trifluoromethyl)phenyl isothiocyanate; 3,5-di-tert-buryl-4-hydroxyphenyl isothiocyanate; 3,5-dichlorophenyl isothiocyanate; 3-(methylthio)propyl isothiocyanate; 3-(trifluoromethyl)phenyl isothiocyanate; 3-bromophenyl isothiocyanate; 3-chlorophenyl isothiocyanate; 3-cyanophenyl isothiocyanate; 3-fluorophenyl isothiocyanate; 3-methoxyphenyl isothiocyanate; 3-methoxypropyl isothiocyanate; 3-nitrophenyl isothiocyanate; 3-pyridyl isothiocyanate; 4-(methylthio)phenyl isothiocyanate; 4-(trifluoromethyl)phenyl isothiocyanate; 4-bromo-2-chlorophenyl isothiocyanate; 4-bromophenyl isothiocyanate; 4-chlorophenyl isothiocyanate; 4-cyanophenyl isothiocyanate; 4-dimethylamino-1-naphthyl isothiocyanate; 4-ethylphenyl isothiocyanate; 4-fluorophenyl isothiocyanate; 4-iodophenyl isothiocyanate; 4-isopropylphenyl isothiocyanate; 4-methoxyphenyl isothiocyanate; 4-methyl-2-nitrophenyl isothiocyanate; 4-methylphenyl isothiocyanate; 4-nitrophenyl isothiocyanate; 5-chloro-2-methylphenyl isothiocyanate; m-tolyl isothiocyanate; o-tolyl isothiocyanate; p-tolyl isothiocyanate; tert-butyl isothiocyanate; acetyl isothiocyanate; benzoyl isothiocyanate; ethyl isothiocyanate; cyclohexyl isothiocyanate; hexyl isothiocyanate; methallyl isothiocyanate; methyl isothiocyanate; pentyl isothiocyanate; and 2,3-dichlorophenyl isothiocyanate.

In accordance with the present invention it is preferred that the constituent comprising the isothiocyanate compound is an essential oil, natural component of an essential oil, or synthetic component of an essential oil (all as described in more detail hereafter) of any of the Cruciferae family of plants. As is known, the Cruciferae family of plants is a large family having over 3,000 species and about 350 genera. The Cruciferae family of plants is also commonly known by the names Brassicaceae family and/or Brassica family. Alternatively, the constituent comprising the isothiocyanate compound may also be an essential oil, natural component of an essential oil, or synthetic component of an essential oil of any other family of plants which may produce an isothiocyanate compound (through, for example, reaction of myrosinase with a glucosinolate compound; either by natural or synthetic introduction of myrosinase) including, for example, the Resedaceae and Capparidaceae families of plants and, as other non-limiting examples, garlic and onion. Production of isothiocyanate compounds either naturally or synthetically through reaction of myrosinase is discussed herein below.

In this respect, any plant species, and preferably any Cruciferae species which is capable of producing an isothiocyanate compound, may be utilized as the constituent (in the instance of utilizing the essential oil or a natural component of the essential oil) or mimicked to provide the constituent (in the instance of utilizing a synthetic component of the essential oil) in the products of the present invention. The Cruciferae family of plants contains plants such as, for example:

(a) broccoli (including, but not limited to, *Brassica oleracea italica*), (b) brussels sprout (including, but not limited to, *Brassica oleracea gemmifera*), (c) cabbage (including, but not limited to, *Brassica oleracea capitata, Brassica pekinensis, Brassica Chinensis Juslenius* (Chinese cabbage), *Brassica Chinensis parachinensis, Brassica campestris L.* var. *chinensis, Brassica Pekinensis, Brassica oleracea L.* var. *tronchuda, Cheiranthus cheiri,* and *Iberis sempervirens*), (d) cauliflower (including, but not limited to, *Brassica Oleracea* var. *Botrytis*), (e) charlock, (f) cole crops, (g) collards, (h) cress (including, but not limited to, *Lepidium sativum*), (i) horseradish (including, but not limited to, *Armoracia rusticana* and *Armoracia lapathifolia*), (j) kale (including, but not limited to, Chinese kale (*Brassica alboglabra*), Siberian kale (*Brassica napus*), *Brassica oleracea L.* var. *botrytis,* and *Brassica oleracea L.* var. *gemmifera,*

(k) kohlrabi (also, kholrabi) (including, but not limited to, *Brassica oleracea L.* var. *gongylodes*), (l) mustard (including, but not limited to, brown mustard (*Brassica juncea*), white mustard (*Brassica alba*), and black mustard (*Brassica nigra*)), (m) nasturium, (n) radish (including, but not limited to, *Raphanus sativus* (Chinese radish)), (o) rapeseed (including, but not limited to, *Brassica napus*), (p) rutabaga, (q) spinach, (r) turnip (including, but not limited to, *Brassica rapa* and *Brassica campestris L.* var. *rapifera*)

(s) watercress (including, but not limited to, *Rorippa nasturtium-aquaticum, Nasturtium officinale,* and *Barbarea verna*), (t) wasabi (Japanese horseradish) (including, but not limited to, *Wasabia japonica* and *Wasabia tenuis*), and (u) yea-kok-choi (including, but not limited to, *Rorippa Indica Hiern*).

See e.g., *Food Chemistry*, Edited by O. R. Fennema, Marcel Dekker, Inc., pp. 602–603 (1985) and *Naturally Occurring Antimicrobials in Food*, Council for Agricultural Science and Technology, pp. 31–32 (1998).

Preferably, the plant is selected from cabbage, broccoli, brussels sprout, turnip, mustard, watercress, radish, wasabi, horseradish, and rapeseed. More preferably, the plant is selected from mustard and horseradish. Most preferably, the plant is mustard, particularly black mustard or white mustard, most particularly white mustard.

Other non-limiting examples of Cruciferae family plants from which the essential oil may be utilized (in the instance of utilizing the essential oil or a natural component of the essential oil) or mimicked (in the instance of utilizing a synthetic component of the essential oil) according to the present invention include those having a following genera: Acanthocardamum, Aethionema, Agallis, Alliaria, Alyssoides, Alysopsis, Alyssum, Ammosperma, Anastatica, Anchonium, Andrzeiowskia, Anelsonia, Aphragmus, Aplanodes, Arabidella, Arabidopsis, Arabis, Arcyosperma, Armoracia, Aschersoniodoxa, Asperuginoides, Asta, Atelanthera, Athysanus, Aubretia, Aurinia, Ballantinia, Barbarea, Berteroa, Berteroella, Biscutella, Bivonaea, Blennodia, Boleum, Boreava, Bornmuellera, Borodinia, Botscantzevia, Brachycarpaea, Brassica, Braya, Brayopsis, Brossardia, Bunias, Cakile, Calepina, Calymmatium, Camelina, Camelinopsis, Capsella, Cardamine, Cardaminopsis, Cardaria, Carinavalva, Carrichtera, Catadysia, Catenulina, Caulanthus, Caulostramina, Ceratocnemum, Ceriosperma, Chalcanthus, Chamira, Chartoloma, Cheesemania, Cheiranthus (also known as Erisymum), Chlorocrambe, Chorispora, Christolea, Chrysobraya, Chrysochamela, Cithareloma, Clastopus, Clausia, Clypeola, Cochlearia, Coelonema, Coincya, Coluteocarpus, Conringia, Cordylocarpus, Coronopus, Crambe, Crambella, Cremolobus, Cryptospora, Cuphonotus, Cusickiella, Cycloptychis, Cymatocarpus, Cyphocardamum, Dactylocardamum, Degenia, Delpinophytum, Descurainia, Diceratella, Dichasianthus, Dictyophragmus, Didesmus, Didymophysa, Dielsiocharis, Dilophia, Dimorphocarpa, Diplotaxis, Dipoma, Diptychocarpus, Dithyrea, Dolichirhynchus, Dontostemon, Douepea, Draba, Drabastrum, Drabopsis, Dryopetalon, Eigia, Elburzia, Enarthrocarpus, Englerocharis, Eremobium, Eremoblastus, Eremodraba, Eremophyton, Ermania, Ermaniopsis, Erophila, Erucaria, Erucastrum, Euclidium, Eudema, Eutrema, Euzomodendron, Farsetia, Fezia, Fibigia, Foleyola, Fortuynia, Galitzkya, Geococcus, Glaribraya, Glastaria, Glaucocarpum, Goldbachia, Gorodkovia, Graellsia, Grammosperma, Guiraoa, Gynophorea, Halimolobos, Harmsiodoxa, Hedinia, Heldreichia, Heliophila, Hemicrambe, Hemilophia, Hesperis, Heterodraba, Hirschfeldia, Hollermayera, Hornungia, Hornwoodia, Hugueninia, Hymenolobus, Iberis, Idahoa, Iodanthus, Ionopsidium, Irenepharsus, Isatis, Ischnocarpus, Iskandera, Iti, Ivania, Kernera, Kremeriella, Lachnocapsa, Lachnoloma, Leavenworthia, Lepidium, Lepidostemon, Leptaleum, Lesquerella, Lignariella, Lithodraba, Lobularia, Lonchophora, Loxostemon, Lunaria, Lyocarpus, Lyrocarpa, Macropodium, Malcolmia, Mancoa, Maresia, Mathewsia, Matthiola, Megacarpaea, Megadenia, Menkea, Menonvillea, Microlepidium, Microsysymbrium, Microstigma, Morettia, Moricandia, Moriera, Morisia, Murbeckiella, Muricaria, Myagrum, Nasturtiopsis, Nasturtium (also known as Rorippa), Neomartinella, Neotchihatchewia, Neotorularia, Nerisyrenia, Neslia, Neuontobotrys, Notoceras, Notothlaspi, Ochthodium, Octoceras, Onuris, Oreoloma, Oreophyton, Ornithocarpa, Orychophragmus, Otocarpus, Oudneya, Pachycladon, Pachymitus, Pachyphragma, Pachypterygium, Parlatoria, Parodiodoxa, Parolinia, Parrya, Parryodes, Pegaeophyton, Peltaria, Peltariopsis, Pennellia, Petiniotia, Petrocallis, Phaeonychium, Phleholobium, Phlegmatospermum, Phoenicaulis, Physaria, Physocardamum, Physoptychis, Physorrhynchus, Platycraspedum, Polyctenium, Polypsecadium, Pringlea, Prionotrichon, Pritzelago, Pseuderucaria, Pseudocamelina, Pseudoclausia, Pseudofortuynia, Pseudovesicaria, Psychine, Pterygiosperma, Pterygostemon, Pugionium, Pycnoplinthopsis, Pycnoplinthus, Pyramidium, Quezeliantha, Quidproquo, Raffenaldia, Raphanorhyncha, Raphanus, Rapistrum, Rehoudia, Redowskia, Rhizobotrya, Ricotia, Robeschia, Rollinsia, Romanschulzia, Roripella, Rytidocarpus, Sameraria, Sarcodraba, Savignya, Scambopus, Schimpera, Schivereckia, Schizopetalon, Schlechteria, Schoenocrambe, Schouwia, Scoliaxon, Selenia, Sibara, Silicularia, Sinapidendron, Sinapis, Sisymbrella, Sisymbriopsis, Sisymbrium, Smelowskia, Sobolewslia, Sohms-Laubachia, Sophiopsis, Sphaerocardamum, Spirorhynchus, Spryginia, Staintoniella, Stanfordia, Stanleya, Stenopetalum, Sterigmostemum, Stevenia, Straussiella, Streptanthella, Streptanthus, Streptoloma, Stroganowia, Stubebdorffia, Subularia, Succowia, Synstemon, Synthlipsis, Taphrospermum, Tauscheria, Teesdalia, Teesdaliopsis, Tetracme, Thelypodiopsis, Thelypodium, Thlaspeocarpa, Thlaspi, Thysanocarpus, Trachystoma, Trichotolinum, Trochiscus, Tropidocarpum, Turritis, Vella, Warea, Weberbauera, Werdermannia, Winklera, Xerodraba, Yinshania, Zerdana, and Zilla.

In accordance with the present invention, it is preferred to utilize an essential oil or, most preferably a natural component thereof, as a constituent of the present products; wherein such is utilized the products may readily be utilized in food and beverage products. Wherein an essential oil, or natural component thereof, is utilized as a constituent of the present products, the oil is preferably derived from a plant which is a member of the Cruciferae family; non-limiting examples of such members are stated above. As used herein, "essential oil" refers to the set of all the compounds that can be distilled from the plant from which the oil is derived and that contributes to the characteristic aroma of that plant. See e.g., H. McGee, *On Food and Cooking*, Charles Scribner's Sons, p. 154–157 (1984). In accordance with the present invention, the essential oil preferably originates from a glucosinolate compound which is capable of producing an isothiocyanate compound (for example, through the catalytic hydrolysis of one or more glucosinolates by the enzyme myrosinase) wherein the precursor and enzyme containing plant tissue is homogenized, ground, crushed, pressed, or otherwise damaged. The essential oil derived from a Cruciferae family plant is obtained using procedures which are commonly known in the art.

As is known in the art, the seeds and/or flowers (preferably seeds) of any of, for example, a Cruciferae species, may be, homogenized, ground, crushed, pressed, or otherwise damaged to activate one or more precursors (e.g., glucosinolates) of the corresponding essential oil. Isothiocyanate compound production from the oil is known to occur by enzyme catalysis upon, for example, homogenizing, grinding, crushing, pressing, or otherwise damaging the plant, seed and/or flower thereof. See e.g., Concannon, WO 94/01121, published Jan. 20, 1994 and Brown et al., "Glucosinolate-Containing Plant Tissues as Bioherbicides", *Journal of Agricultural Food Chemistry*, Vol. 43, pp. 3070–3074 (1995). The enzyme commonly known to participate in the production of the isothiocyanate compound upon interaction with a glucosinolate is myrosinase, which is also known as thioglucoside glucohydrolase (and having enzyme classification number EC 3.2.3.1). Myrosinase is known to be non-specific for various glucosinolates.

The essential oil may be obtained from any of a variety of known methods. For example, the plant utilized may be homogenized, ground, crushed, pressed, or otherwise damaged (e.g., cut); the essential oil may then be extracted using a volatile organic solvent, for example, an alcohol (e.g., methanol) or diethyl ether, or a compound such as propylene glycol. See e.g., Ono et al., "6-Methylsulfinylhexyl Isothiocyanate and Its Homologues as Food-originated Compounds with Antibacterial Activity against *Escherichia coli* and *Staphylococcus aureus*", *Bioscience, Biotechnology, and Biochemistry*, Vol. 62(2), pp. 363–365 (1998). Alternatively, the essential oil may be obtained via distillation (for example, steam distillation depending upon the volatility of the isothiocyanate compound present therein) after homogenizing, grinding, crushing, pressing, or otherwise damaging the plant, seed, flower, and/or any other component thereof. See e.g., Isshiki et al., "Preliminary Examination of Allyl Isothiocyanate Vapor for Food Preservation", *Bioscience, Biotechnology, and Biochemistry*, Vol. 56(9), pp. 1476–1477 (1992). As another non-limiting example, the plant, seed, flower, and/or any other component thereof, may be centrifuged with water.

The essential oil itself, which contains one or more isothiocyanate compounds, may then be utilized in the products and methods of the present invention.

Alternatively, a natural component of the essential oil may be utilized. As used herein, the term "natural component", with reference to the corresponding essential oil, refers to a component utilized in the present invention which is obtained from the naturally occurring essential oil. The essential oil is preferably of a Cruciferae family plant. As stated herein above, the natural component of the essential oil should comprise one or more isothiocyanate compounds (i.e., a compound bearing a —N=C=S moiety).

The method by which the natural component is obtained from the essential oil is not critical to the present invention. According to the present invention, the natural component should comprise one or more isothiocyanate compounds and may optionally comprise further components derived from the essential oil. To illustrate, the natural component of the essential oil may be obtained through standard purification of the essential oil itself to obtain one or more isothiocyanate compounds using, for example, extraction, chromatography, or distillation. For example, common chromatography techniques (e.g., HPLC) may be utilized to obtain a natural component of the essential oil. See e.g., Ono et al., "6-Methylsulfinylhexyl Isothiocyanate and Its Homologues as Food-originated Compounds with Antibacterial Activity against *Escherichia coli* and *Staphylococcus aureus*", *Bioscience, Biotechnology, and Biochemistry*, Vol. 62(2), pp. 363–365 (1998). As a further example, an essential oil once distilled (the essential oil itself) may again be distilled to remove volatile components not of interest or to remove the isothiocyanate compound of interest. It is a preferred embodiment of the present invention to utilize a natural component of the essential oil.

Alternative to utilizing the essential oil or natural component thereof in the present invention, a synthetic component of an essential oil, preferably a Cruciferae essential oil, may be utilized. As used herein, the term "synthetic component" with reference to the corresponding essential oil refers to a component utilized in the present invention which naturally occurs in an essential oil which has been activated through myrosinase, but which is rather obtained through synthetic techniques without extraction or purification from a naturally occurring essential oil. As stated herein above, the synthetic component of the essential oil should comprise one or more isothiocyanate compounds (i.e., a compound bearing a —N=C=S moiety).

A variety of synthetic isothiocyanate compounds may be commercially obtained, for example, from Aldrich Chemical Co., Milwaukee, Wis.; Fluka Chemical Co., Milwaukee, Wis.; Sigma Chemical Co., St. Louis, Mo.; and Lancaster Synthesis Inc., Windham, N.H. Additionally, synthetic methods of preparing isothiocyanate compounds are well-known in the art. See e.g., J. March, *Advanced Organic Chemistry*, John Wiley & Sons (1992). Additionally, natural production of isothiocyanate compounds may be synthetically mimicked by commercially obtaining one or more glucosinolate compounds and introducing myrosinase which may be isolated from any myrosinase producing plant (as discussed above) or commercially obtained (for example, myrosinase is commercially available as thioglucosidase from Sigma Chemical Co., St. Louis, Mo.). Alternatively, natural production of isothiocyanate compounds may be synthetically mimicked by isolating a glucosinolate compound from any glucosinolate producing plant and introducing myrosinase which is commercially obtained.

The following non-limiting examples demonstrate methods of obtaining the isothiocyanate compound, either as the essential oil, a natural component thereof, or synthetic component thereof:

EXAMPLE 1

The following example illustrates isolation of an essential oil (by one distillation from the seed). Black mustard essential oil is steam distilled from crushed black mustard seed (commercially available from Specialty Brands, San Franciso, Calif.). Without intending to be limited by theory, the seed contains a glucosinolate substrate and myrosinase. The seed is crushed, allowing interaction of the glucosinolate substrate and myrosinase, to provide an isothiocyanate. The isothiocyanate (as part of the essential oil) is steam distilled. The distillate is analyzed using standard methods. A key component of the distillate mixture is found to be allyl isothiocyanate. The distillate may then be mixed in oil (oleoresin) or spray-dried after mixing with a dextrin/starch powder. The distillate mixture may then be utilized in, for example, a food or beverage product.

EXAMPLE 2

The following example illustrates a natural component of an essential oil (by twice distillation). White mustard essential oil is distilled from crushed white mustard seed (commercially available from Kroger® Grocery Store, Cincinnati, Ohio as "Ground Mustard"). Without intending to be limited by theory, the seed contains a glucosinolate substrate and myrosinase. The seed is crushed, allowing interaction of the glucosinolate substrate and myrosinase, to provide an isothiocyanate. The isothiocyanate (as part of the essential oil) is distilled. Volatile components of the distillate are removed by steam distillation. The residue (non-volatile component) is analyzed using standard methods. A key component of the residue is found to be p-hydroxybenzyl isothiocyanate. The residue is mixed in a flavor oil and then utilized in, for example, a food or beverage product.

EXAMPLE 3

White mustard essential oil is distilled from crushed white mustard seed (about 2 grams, commercially available from Kroger® Grocery Store, Cincinnati, Ohio as "Ground Mustard"). Without intending to be limited by theory, the seed contains a glucosinolate substrate and myrosinase. To this is added water (about 2 grams). The mixture is mixed for about 30 minutes. Propylene glycol (about 10 grams) is added to the mixture and centrfuged at about 2,000 RPM for about 15 minutes. The propylene glycol layer is obtained and the layer is tested for antimicrobial effect.

Sorbate and Benzoate Preservatives

In addition to the constituent comprising one or more isothiocyanate compounds, a sorbate or benzoate preservative (or mixtures thereof) is utilized herein. The sorbate or benzoate preservative is optional, but preferable, in the beverage products of the present invention because the present inventors have surprisingly discovered that the isothiocyanate compound alone is sufficient to exhibit an antimicrobial effect without imparting off-flavors and/or offensive odors in beverage products.

Sorbate and benzoate preservatives suitable for use in the present invention include sorbic acid, benzoic acid, and salts thereof, including (but not limited to) calcium sorbate, sodium sorbate, potassium sorbate, calcium benzoate, sodium benzoate, potassium benzoate, and mixtures thereof. Sorbate preservatives are particularly preferred. Potassium sorbate is particularly preferred for use in the present invention, especially for dilute juice beverages and other beverage products requiring good water solubility.

Wherein a product comprises a sorbate or benzoate preservative, the products of the present invention preferably comprise from about 5 ppm to about 400 ppm of a sorbate or benzoate preservative, more preferably from about 10 ppm to about 350 ppm of a sorbate or benzoate preservative, and most preferably from about 30 ppm to about 300 ppm of a sorbate or benzoate preservative. Wherein the product comprises a mixture of one or more sorbate or benzoate preservatives, the total concentration of such preservatives is preferably maintained within these ranges.

Food and Beverage Products of the Present Invention

The food and beverage products contemplated within the present invention include, for example, baked good mixes (e.g., breads, cakes, brownies, muffins, cookies, pastries, pies, crackers, pie crusts), fried snacks derived from potatoes, corn, wheat and other grains (e.g., Pringle's® potato chips, corn chips, tortilla chips), other fried farinaceous snack foods (e.g., french fries, doughnuts, fried chicken), dairy products and dairy products (e.g., butter, ice cream and other fat-containing frozen desserts, yogurt, and cheeses, including natural cheeses, processed cheeses, cream cheese, cottage cheese, cheese foods, cheese spread, milk, cream, sour cream, butter milk, and creamers), cereal products, baby foods or formulas, puddings, ice cream, dips, syrups, pie and other dessert fillings, frostings, emulsified spreads, salad dressings, mayonnaise, margarine, various kinds of soups, dips, sauces, and gravies, processed meat products such as sausages, hot dogs, and uncooked fermented manufactured meat products wines, juices, teas, and purees.

The isothiocyanate compound as described herein (optionally together with the sorbate or benzoate preservative) is particularly useful in beverage products, especially dilute juice beverages, fortified beverages (e.g., calcium fortified beverage), beverage products containing tea solids (i.e., teas), and beverages containing milk solids. The isothiocyanate compound is most preferably present in the aqueous phase of the beverage product for effective antimicrobial effect. Preferred beverage products of the present invention are those comprising a beverage member selected from the group consisting of water, fruit juice, tea solids, milk solids, fruit flavors, botanical flavors, and mixtures thereof. The beverage products herein are most preferably dilute juice beverages (particularly fruit juice beverages) and beverages containing tea solids, and beverage products comprising fruit juice and tea solids. Particularly preferred beverage products comprise both fruit juice and water. Other particularly preferred beverage products comprise both tea solids and water. In another preferred embodiment, "near water" (lightly flavored water) is utilized.

Various optional elements may be incorporated into the products and methods of the present invention. Non-limiting examples of optional elements are as follows:

Water

Water may be included in the products and methods of the present invention. As used herein, the term "water" includes the total amount of water present in the composition. "Water" includes water from flavor agents, sugar syrups, and other sources, e.g., gum solutions. Water of hydration of, for example, calcium and other solids, is also included. Wherein water is included, water is preferably included at levels from about 0.1% to about 99.999%, more preferably from about 5% to about 99%, still more preferably from about 10% to about 95%, even more preferably from about 15% to about 90%, and most preferably from about 25% to about 90%, by weight of the product.

Beverage Emulsions

Dilute juice beverages of the present invention may optionally, but preferably, comprise from about 0.2% to about 5%, preferably from about 0.5% to about 3%, and most preferably from about 0.8% to about 2%, of a beverage emulsion. This beverage emulsion can be either a cloud emulsion or a flavor emulsion.

For cloud emulsions, the clouding agent can comprise one or more fats or oils stabilized as an oil-in-water emulsion using a suitable food grade emulsifier. Any of a variety of fats or oils may be employed as the clouding agent, provided that the fat or oil is suitable for use in foods and/or beverages. Preferred are those fats and oils that have been refined, bleached and deodorized to remove off-flavors. Especially suitable for use as clouding agents are those fats that are organoleptically neutral. These include fats from the following sources: vegetable fats such as soybean, corn, safflower, sunflower, cottonseed, canola, and rapeseed; nut fats such as coconut, palm, and palm kernel; and synthetic fats. See e.g., Kupper et al., U.S. Pat. No. 4,705,691, issued Nov. 10, 1987, for suitable fat or oil clouding agents.

Any suitable food grade emulsifier can be used that can stabilize the fat or oil clouding agent as an oil-in-water emulsion. Suitable emulsifiers include gum acacia, modified food starches (e.g., alkenylsuccinate modified food starches), anionic polymers derived from cellulose (e.g., carboxymethylcellulose), gum ghatti, modified gum ghatti, xanthan gum, tragacanth gum, guar gum, locust bean gum, pectin, and mixtures thereof. See e.g., Kupper et al., U.S. Pat. No. 4,705,691, issued Nov. 10, 1987. Modified starches treated to contain hydrophobic as well as hydrophilic groups, such as those described in Caldwell et al., U.S. Pat. No. 2,661,349, are preferred emulsifiers for use as herein. Octenyl succinate (OCS) modified starches such as those described in Marotta et al., U.S. Pat. No. 3,455,838 and Barndt et al., U.S. Pat. No. 4,460,617 are especially preferred emulsifiers.

The clouding agent can be combined with a weighting agent to provide a beverage opacifier that imparts a total or partial opaque effect to the beverage without separating out and rising to the top. The beverage opacifier provides the appearance to the consumer of a juice-containing beverage. Any suitable weighting oil can be employed in the beverage opacifier. Typical weighting oils include brominated vegetable oil, glycerol ester of wood rosin (ester gum), sucrose acetate isobutyrate (SAIB) and other sucrose esters, gum damar, colophony, gum elemi, or others known to those skilled in the art. Other suitable weighting agents include brominated liquid polyol polyesters which are nondigestible. See e.g., Brand et al., U.S. Pat. No. 4,705,690, issued Nov. 10, 1987.

The cloud/opacifier emulsion is prepared by mixing the clouding agent with the weighting agent (for opacifier emulsions), the emulsifier and water. The emulsion typically contains from about 0.1% to about 25% clouding agent, from about 1% to about 20% weighting oil agent (in the case of opacifier emulsions), from about 1% to about 30% emulsifiers, and from about 25% to about 97.9% water (or *quantum satis*).

The particle size of the water-insoluble components of the emulsion is reduced by employing a suitable apparatus known in the art. Because the ability of emulsifying agents to hold oil in suspension is proportional to particle size, emulsions of particles with diameters of about 0.1 to about 3.0 microns are suitable. Preferably, the particles are about 2.0 microns or less in diameter. Most preferred is an emulsion in which substantially all the particles are 1.0 microns or less in diameter. The particle size is reduced by passing the mixture through an homogenizer, colloid mill or turbine-type agitator. Usually one or two passes is sufficient. See e.g., Kupper et al., U.S. Pat. No. 4,705,691, issued Nov. 10, 1987.

Flavor emulsions useful in beverage products of the present invention comprise one or more suitable flavor oils, extracts, oleoresins, essential oils and the like, known in the art for use as flavorants in beverages. This component can also comprise flavor concentrates such as those derived from concentration of natural products such as fruits. Terpeneless citrus oils and essences can also be used herein. Examples of suitable flavors include, for example, fruit flavors such as orange, lemon, lime and the like, cola flavors, tea flavors, coffee flavors, chocolate flavors, dairy flavors. These flavors can be derived from natural sources such as essential oils and extracts, or can be synthetically prepared. The flavor emulsion typically comprises a blend of various flavors and can be employed in the form of an emulsion, alcoholic extract, or spray dried. The flavor emulsion can also include clouding agents, with or without weighting agents, as previously described. See e.g., Kupper et al., U.S. Pat. No. 4,705,691, issued Nov. 10, 1987.

Flavor emulsions are typically prepared in the same manner as cloud/opacifier emulsions by mixing one or more flavoring oils (from about 0.001% to about 20%) with an emulsifying agent (from about 1% to about 30%) and water. (The oil clouding agents can also be present). Emulsions of particles with diameters of from about 0.1 to about 3.0 microns are suitable. Preferably, the particles are about 2.0 microns or less in diameter. Most preferably, the particles are about 1.0 microns or less in diameter. The emulsifying agent coats the particularized flavor oil to aid in preventing coalescence and in maintaining an appropriate dispersion. The viscosity and specific gravity of the flavor emulsion are regulated to be compatible with the finished beverage. See e.g., Kupper et al., U.S. Pat. No. 4,705,691, issued November 10, 1987.

Flavor Agents

The dilute juice beverages of the present invention optionally, but preferably, comprise one or more flavor agents selected from fruit juice, tea solids, milk solids, fruit flavors, botanical flavors, and mixtures thereof. When fruit juice is included, the beverages of the present invention can comprise from about 0.1% to about 40%, preferably from about 1% to about 20%, more preferably from about 2% to about 10%, and most preferably from about 3% to about 6%, fruit juice. (As measured herein, the weight percentage of fruit juice is based on a single strength 2° to 16° Brix fruit juice). The fruit juice can be incorporated into the beverage as a puree, comminute, or as a single strength or concentrated juice. Especially preferred is incorporation of the fruit juice as a concentrate with a solids content (primarily as sugar solids) of from about 20° to about 80° Brix.

The fruit juice can be any citrus juice, non-citrus juice, or mixture thereof, which are known for use in dilute juice beverages. The juice can be derived from, for example, apple, cranberry, pear, peach, plum, apricot, nectarine, grape, cherry, currant, raspberry, gooseberry, elderberry, blackberry, blueberry, strawberry, lemon, lime, mandarin, orange, grapefruit, cupuacu, potato, tomato, lettuce, celery, spinach, cabbage, watercress, dandelion, rhubarb, carrot, beet, cucumber, pineapple, coconut, pomegranate, kiwi, mango, papaya, banana, watermelon, passion fruit, tangerine, and cantaloupe. Preferred juices are derived from apple, pear, lemon, lime, mandarin, grapefruit, cranberry, orange, strawberry, tangerine, grape, kiwi, pineapple, passion fruit, mango, guava, raspberry and cherry. Citrus juices, preferably grapefruit, orange, lemon, lime, and mandarin juices, as well as juices derived from mango, apple, passion fruit, and guava, as well as mixtures of these juices are most preferred.

Fruit flavors may also be utilized. As described above with respect to flavor emulsions, fruit flavors may be derived from natural sources such as essential oil and extracts, or can be synthetically prepared. Fruit flavors may be derived from fruits through processing, particularly concentrating. Wherein fruit juices are concentrated or evaporated, the water which is removed or the condensate contains volatile substances which comprise the flavor of the fruit. Often, such flavor is added to a juice concentrate to enhance the flavor thereof. The condensate may also be used to flavor "near waters" (lightly flavored water).

Botanical flavors may also be utilized. As used herein, the term "botanical flavor" refers to a flavor derived from parts of a plant other than the fruit; i.e., derived from nuts, bark, roots, and/or leaves. Also included within the term "botanical flavor" are synthetically prepared flavors made to simulate botanical flavors derived from natural sources. Botanical flavors can be derived from natural sources such as essential oils and extracts, or can be synthetically prepared. Suitable botanical flavors include jamaica, kola, marigold, chrysanthemum, chamomile, ginger, valerian, yohimbe, hops, eriodictyon, ginseng, bilberry, rice, red wine, mango, peony, lemon balm, nut gall, oak chip, lavender, walnut, gentiam, luo han guo, cinnamon, angelica, aloe, agrimony, yarrow and mixtures thereof.

Tannic acid or other similar acids can be used to provide an astringent taste to the beverage. From about 0.001% to about 10% tannic acid is used. Other flavor enhancers, as well as flavorants such as chocolate and vanilla can also be used.

Wherein tea solids are included, the beverages of the present invention can comprise from about 0.01% to about 1.2%, preferably from about 0.05% to about 0.8%, by weight of the beverage product, of tea solids. The term "tea solids" as used herein means solids extracted from tea materials including those materials obtained from the genus Camellia including *C. sinensis* and *C. assaimica*, for instance, freshly gathered tea leaves, fresh green tea leaves that are dried immediately after gathering, fresh green tea leaves that have been heat treated before drying to inactivate any enzymes present, unfermented tea, instant green tea, and partially fermented tea leaves. Green tea materials are tea leaves, tea plant stems, and other plant materials that are related and which have not undergone substantial fermentation to create black teas. Members of the genus Phyllanthus, *Catechu gambir* and Uncaria family of tea plants can also be used. Mixtures of unfermented and partially fermented teas can be used.

Tea solids for use in beverages of the present invention can be obtained by known and conventional tea solid extraction methods. A particularly preferred source of green tea solids can be obtained by the method described in Ekanayake et al., U.S. application Ser. No. 08/606,907, filed Feb. 26, 1996. Tea solids so obtained will typically comprise caffeine, theobromine, proteins, amino acids, minerals and carbohydrates. Suitable beverages containing tea solids can be formulated according to Tsai et al., U.S. Pat. No. 4,946,701, issued Aug. 7, 1990. See also, Ekanayake et al., U.S. Pat. No. 5,427,806, issued Jun. 26, 1995, for a suitable sources of green tea solids for use in the present invention.

Beverages according to the present invention may also comprise milk solids. These milk solids can be derived from various sources including whole milk, skim milk, condensed milk, and dried milk powder. As used herein, the term "milk" will be used to describe an aqueous dispersion of milk solids, such as fluid (whole or skim milk) or non-fat dry milk or condensed milk diluted with water. The amount of milk included typically ranges from about 5% to about 99.8%, preferably from about 5% to about 75%, more preferably from about 5% to about 40%, and most preferably from about 5% to about 15%. The amount of non-fat milk solids correlating to these levels of milk solids is in the range of from about 0.5% to about 8.2%, from about 0.5% to about 6.2%, from about 0.5% to about 3.3%, and from about 0.5% to 1.2% of the beverage, respectively.

Thickeners

Beverages according to the present invention, especially dilute juice beverages and beverages comprising tea solids can further comprise thickeners, including xanthan gum, carboxymethylcellulose, propylene glycol alginate, gellan gum, guar gum, pectin, tragacanth gum, gum acacia, locust bean gum, gum arabic, gelatin, as well as mixtures of these thickeners. These thickeners are typically included in the beverages of the present invention at levels up to about 0.1%, depending on the particular thickener involved and the viscosity effects desired.

Sweeteners

The beverages of the present invention can, and typically will, contain an effective amount of one or more sweeteners, including carbohydrate sweeteners and natural and/or artificial no/low calorie sweeteners. The amount of the sweetener used in the beverages of the present invention typically depends upon the particular sweetener used and the sweetness intensity desired. For no/low calorie sweeteners, this amount varies depending upon the sweetness intensity of the particular sweetener.

The beverages of the present invention can be sweetened with any of the carbohydrate sweeteners, preferably monosaccharides and/or disaccharides. Sweetened beverages will typically comprise from about 0.1% to about 20%, most preferably from about 6 to about 14%, sweetener. These sugars can be incorporated into the beverages in solid or liquid form but are typically, and preferably, incorporated as a syrup, most preferably as a concentrated syrup such as high fructose corn syrup. For purposes of preparing beverages of the present invention, these sugar sweeteners can be provided to some extent by other components of the beverage such as, for example, the fruit juice component and/or flavors.

Preferred sugar sweeteners for use in beverage products of the present invention are sucrose, fructose, glucose, and mixtures thereof. Fructose can be obtained or provided as liquid fructose, high fructose corn syrup, dry fructose or fructose syrup, but is preferably provided as high fructose corn syrup. High fructose corn syrup (HFCS) is commercially available as HFCS-42, HFCS-55 and HFCS-90, which comprise 42%, 55% and 90%, respectively, by weight of the sugar solids therein, as fructose. Other naturally occurring sweeteners or their purified extracts, such as glycyrrhizin, the protein sweetener thaumatin, the juice of Luo Han Guo disclosed in, for example, Fischer et al., U.S. Pat. No. 5,433,965, issued Jul. 18, 1995, and the like can also be used in the beverages of the present invention.

Suitable no/low calorie sweeteners include saccharin, cyclamates, acesulfam K (Sunette®), L-aspartyl-L-phenylalanine lower alkyl ester sweeteners (e.g., aspartame); L-aspartyl-D-alanine amides disclosed in Brennan et al., U.S. Pat. No. 4,411,925; L-aspartyl-D-serine amides disclosed in Brennan et al., U.S. Pat. No. 4,399,163; L-aspartyl-L-1-hydroxymethylalkaneamide sweeteners disclosed in Brand, U.S. Pat. No. 4,338,346; L-aspartyl-1-hydroxyethylalkaneamide sweeteners disclosed in Rizzi, U.S. Pat. No. 4,423,029; L-aspartyl-D-phenylglycine ester and amide sweeteners disclosed in Janusz, European Patent Application 168,112, published Jan. 15, 1986; N-[N-3,3-dimethylbutyl)-L-□-aspartyl]-L-phenylalanine 1-methyl ester sweeteners disclosed in Gerlat et al., WO 99/30576, assigned to The Nutrasweet Co., published Jun. 24, 1999; and the like and mixtures thereof. A particularly preferred low calorie sweetener is aspartame.

Coloring Agent

Small amounts of coloring agents may be utilized in the products of the present invention. FD&C dyes (e.g., yellow #5, blue #2, red # 40) and/or FD&C lakes are preferably used. By adding the lakes to the other powdered ingredients, all the particles, in particular the colored iron compound, are completely and uniformly colored and a uniformly colored beverage mix is attained. Preferred lake dyes which may be used in the present invention are the FDA-approved Lake, such as Lake red #40, yellow #6, blue #1, and the like. Additionally, a mixture of FD&C dyes or a FD&C lake dye in combination with other conventional food and food colorants may be used. Riboflavin and □-carotene may also be used. The exact amount of coloring agent used will vary, depending on the agents used and the intensity desired in the finished product. The amount can be readily determined by one skilled in the art. Generally, if utilized, the coloring agent should be present at a level of from about 0.0001% to about 0.5%, preferably from about 0.001% to about 0.1%, and most preferably from about 0.004% to about 0.1%, by weight of the product.

Nutrients

A distinct advantage of the products of the present invention relates to the discovery that the antimicrobial effect of the products is maintained even in the presence of fortification nutrients such as calcium, thus overcoming the problems associated with currently fortified products. The products herein (particularly the food and beverage products) can therefore be fortified with one or more nutrients, especially one or more vitamins and/or minerals. The U.S. Recommended Daily Intake (USRDI) for vitamins and minerals are defined and set forth in the Recommended Daily Dietary Allowance-Food and Nutrition Board, National Academy of Sciences-National Research Council.

Unless otherwise specified herein, wherein a given mineral is present in the product, the product comprises at least about 1%, preferably at least about 5%, more preferably from about 10% to about 200%, even more preferably from about 40% to about 150%, and most preferably from about 60% to about 125% of the USRDI of such mineral. Unless otherwise specified herein, wherein a given vitamin is present in the product, the product comprises at least about 1%, preferably at least about 5%, more preferably from about 10% to about 200%, even more preferably from about 20% to about 150%, and most preferably from about 25% to about 120% of the USRDI of such vitamin.

Non-limiting examples of such vitamins and minerals, include iron, zinc, copper, calcium, phosphorous, niacin, thiamin, folic acid, pantothenic acid, iodine, vitamin A, vitamin C, vitamin $B_2$, vitamin $B_3$, vitamin $B_6$, vitamin $B_{12}$, vitamin D, vitamin E, and vitamin K. Preferably, wherein a vitamin or mineral is utilized the vitamin or mineral is selected from iron, zinc, calcium, niacin, thiamin, folic acid, iodine, vitamin A, vitamin C, vitamin $B_6$, vitamin $B_{12}$, vitamin D, and vitamin E. A particularly preferred mineral for use herein is calcium.

Commercially available vitamin A sources may also be included in the present products. Vitamin A can be provided, for example, as vitamin A palmitate (retinol palmitate) and/or as beta-carotene. The vitamin A may be in the form of, for example, an oil, beadlets or encapsulated. As used herein, "vitamin A" includes, but is not limited to, vitamin A, β-carotene, retinol palmitate, and retinol acetate. Wherein vitamin A is present in the products herein, the product comprises at least about 1%, preferably at least about 5%, more preferably from about 10% to about 200%, even more preferably from about 15% to about 150%, and most preferably from about 20% to about 120% of the USRDI of such vitamin. Wherein vitamin A is present in the products herein, it is especially preferred to include about 25% of the USRDI of vitamin A. The quantity of vitamin A to be added is dependent on processing conditions and the amount of vitamin A deliver desired after storage. Preferably, wherein vitamin A is included within the present products, the products comprise from about 0.0001% to about 0.2%, more preferably from about 0.0002% to about 0.12%, also preferably from about 0.0003% to about 0.1%, even more preferably from about 0.0005% to about 0.08%, and most preferably from about 0.001% to about 0.06% of vitamin A, by weight of the product.

Commercially available sources of vitamin $B_2$ (also known as riboflavin) may be utilized in the present products. Wherein vitamin $B_2$ is present in the products herein, the product comprises at least about 1%, preferably at least about 5%, more preferably from about 5% to about 200%, even more preferably from about 10% to about 150%, and most preferably from about 10% to about 120% of the USRDI of such vitamin. Wherein vitamin $B_2$ is present in the products herein, it is especially preferred to include from about 15% to about 35% of the USRDI of vitamin $B_2$.

Commercially available sources of vitamin C can be used herein. Encapsulated ascorbic acid and edible salts of ascorbic acid can also be used. Wherein vitamin C is present in the products herein, the product comprises at least about 1%, preferably at least about 5%, more preferably from about 10% to about 200%, even more preferably from about 20% to about 150%, and most preferably from about 25% to about 120% of the USRDI of such vitamin. Wherein vitamin C is present in the products herein, it is especially preferred to include about 100% of the USRDI of vitamin C. The quantity of vitamin C to be added is dependent on processing conditions and the amount of vitamin C deliver desired after storage. Preferably, wherein vitamin C is included within the present products, the products comprise from about 0.005% to about 0.2%, more preferably from about 0.01% to about 0.12%, also preferably from about 0.02% to about 0.1%, even more preferably from about 0.02% to about 0.08%, and most preferably from about 0.03% to about 0.06% of vitamin C, by weight of the product.

Commercial sources of iodine, preferably as an encapsulated iodine may be utilized herein. Other sources of iodine include iodine-containing salts, e.g., sodium iodide, potassium iodide, potassium iodate, sodium iodate, or mixtures thereof. These salts may be encapsulated.

Nutritionally supplemental amounts of other vitamins which may be incorporated herein include, but are not limited to, vitamins $B_6$ and $B_{12}$, folic acid, niacin, pantothenic acid, folic acid, vitamin D, and vitamin E. Wherein the product comprises one of these vitamins, the product preferably comprises at least 5%, preferably at least 25%, and most preferably at least 35% of the USRDI for such vitamin.

Minerals which may optionally be included in the products herein are, for example, magnesium, zinc, iodine, iron, and copper. Any soluble salt of these minerals suitable for inclusion edible products can be used, for example, magnesium citrate, magnesium gluconate, magnesium sulfate, zinc chloride, zinc sulfate, potassium iodide, copper sulfate, copper gluconate, and copper citrate.

Calcium is a particularly preferred mineral for use in the present invention. Preferred sources of calcium include, for example, amino acid chelated calcium, calcium carbonate, calcium oxide, calcium hydroxide, calcium sulfate, calcium chloride, calcium phosphate, calcium hydrogen phosphate, calcium dihydrogen phosphate, calcium citrate, calcium malate, calcium titrate, calcium gluconate, calcium realate, calcium tantrate, and calcium lactate, and in particular calcium citrate-malate. The form of calcium citrate-malate is described in, e.g., Mehansho et al., U.S. Pat. No. 5,670,344, issued Sep. 23, 1997; Diehl et al., U.S. Pat. No. 5,612,026, issued Mar. 18, 1997; Andon et al., U.S. Pat. No. 5,571,441, issued Nov. 5, 1996; Meyer et al., U.S. Pat. No. 5,474,793, issued Dec. 12, 1995; Andon et al., U.S. Pat. No. 5,468,506, issued Nov. 21, 1995; Burkes et al., U.S. Pat. No. 5,445,837, issued Aug. 29, 1995; Dake et al., U.S. Pat. No. 5,424,082, issued Jun. 13, 1995; Burkes et al., U.S. Pat. No. 5,422,128, issued Jun. 6, 1995; Burkes et al., U.S. Pat. No. 5,401,524, issued Mar. 28, 1995; Zuniga et al., U.S. Pat. No. 5,389,387, issued Feb. 14, 1995; Jacobs, U.S. Pat. No. 5,314,919, issued May 24, 1994; Saltman et al., U.S. Pat. No. 5,232,709, issued Aug. 3, 1993; Camden et al., U.S. Pat. No. 5,225,221, issued Jul. 6, 1993; Fox et al., U.S. Pat. No. 5,215,769, issued Jun. 1, 1993; Fox et al., U.S. Pat. No. 5,186,965, issued Feb. 16, 1993; Saltman et al., U.S. Pat. No. 5,151,274, issued Sep. 29, 1992; Kochanowski, U.S. Pat. No. 5,128,374, issued Jul. 7, 1992; Mehansho et al., U.S. Pat. No. 5,118,513, issued Jun. 2, 1992; Andon et al., U.S. Pat. No. 5,108,761, issued Apr. 28, 1992; Mehansho et al., U.S. Pat. No. 4,994,283, issued Feb. 19, 1991; Nakel et al., U.S. Pat. No. 4,786,510, issued Nov. 22, 1988; and Nakel et al., U.S. Pat. No. 4,737,375, issued Apr. 12, 1988. Preferred products of the present invention will comprise from about 0.01% to about 0.5%, more preferably from about 0.03% to about 0.2%, even more preferably from about 0.05% to about 0.15%, and most preferably from about 0.1% to about 0.15% of calcium, by weight of the product.

Iron may also be utilized in the products and methods of the present invention. Acceptable forms of iron are well-known in the art. The amount of iron compound incorporated into the product will vary widely depending upon the level of supplementation desired in the final product and the targeted consumer. Iron fortified products of the present invention typically contain from about 5% to about 100%, preferably from about 15% to about 50%, and most preferably about 20% to about 40% of the USRDI for iron.

Ferrous iron is typically better utilized by the body than ferric iron. Highly bioavailable ferrous salts that can be used in the ingestible products of the present invention are ferrous sulfate, ferrous fumarate, ferrous succinate, ferrous gluconate, ferrous lactate, ferrous tartarate, ferrous citrate, ferrous amino acid chelates, as well as mixtures of these ferrous salts. While ferrous iron is typically more bioavailable, certain ferric salts can also provide highly bioavailable sources of iron. Highly bioavailable ferric salts that can be used in the food or beverage products of the present invention are ferric saccharate, ferric ammonium citrate, ferric citrate, ferric sulfate, as well as mixtures of these ferric salts. Combinations or mixtures of highly bioavailable ferrous and ferric salts can be used in these edible mixes and ready-to-serve beverages. The preferred sources of highly bioavailable iron are ferrous fumarate and ferrous amino acid chelates.

Ferrous amino acid chelates particularly suitable as highly bioavailable iron sources for use in the present invention are those having a ligand to metal ratio of at least 2:1. For example, suitable ferrous amino acid chelates having a ligand to metal mole ratio of two are those of formula:

$$Fe(L)_2$$

where L is an alpha amino acid, dipeptide, tripeptide, or quadrapeptide ligand. Thus, L can be any ligand which is a naturally occurring alpha amino acid selected from alanine, arginine, asparagine, aspartic acid, cysteine, cystine, glutamine, glutamic acid, glycine, histidine, hydroxyproline, isoleucine, leucine, lysine, methionine, ornithine, phenylalanine, proline, serine, threonine, tryptophan, tyrosine, and valine; or dipeptides, tripeptides, or quadrapeptides formed by any combination of these alpha amino acids. See e.g., Ashmead et al., U.S. Pat. No. 4,863,898, issued Sep. 5, 1989; Ashmead, U.S. Pat. No. 4,830,716, issued May 16, 1989; and Ashmead, U.S. Pat. No. 4,599,152, issued Jul. 8, 1986, all of which are incorporated by reference. Particularly preferred ferrous amino acid chelates are those where the reacting ligands are glycine, lysine, and leucine. Most preferred is the ferrous amino acid chelate sold under the mark Ferrochel® (Albion Laboratories, Salt Lake City, Utah) wherein the ligand is glycine.

In addition to these highly bioavailable ferrous and ferric salts, other sources of bioavailable iron can be included in the food and beverage products of the present invention. Other sources of iron particularly suitable for fortifying products of the present invention included certain iron-sugar-carboxylate complexes. In these iron-sugar-carboxylate complexes, the carboxylate provides the counterion for the ferrous (preferred) or ferric iron. The overall synthesis of these iron-sugar-carboxylate complexes involves the formation of a calcium-sugar moiety in aqueous media (for example, by reacting calcium hydroxide with a sugar, reacting the iron source (such as ferrous ammonium sulfate) with the calcium-sugar moiety in aqueous media to provide an iron-sugar moiety, and neutralizing the reaction system with a carboxylic acid (the "carboxylate counterion") to provide the desired iron-sugar-carboxylate complex. Sugars that can be used to prepare the calcium-sugar moiety include any of the ingestible saccharidic materials, and mixtures thereof, such as glucose, sucrose and fructose, mannose, galactose, lactose, maltose, and the like, with sucrose and fructose being the more preferred. The carboxylic acid providing the "carboxylate counterion" can be any ingestible carboxylic acid such as citric acid, malic acid tartaric acid, lactic acid, succinic acid, propionic acid, etc., as well as mixtures of these acids.

These iron-sugar-carboxylate complexes can be prepared in the manner described in, e.g., Nakel et al., U.S. Pat. Nos. 4,786,510 and 4,786,518, issued Nov. 22, 1988, both of which are incorporated by reference. These materials are referred to as "complexes", but they may exist in solution as complicated, highly hydrated, protected colloids; the term "complex" is used for the purpose of simplicity.

Zinc may also be utilized in the products and methods of the present invention. Acceptable forms of zinc are well-known in the art. Zinc fortified products of the present invention typically contain from about 5% to about 100%, preferably from about 15% to about 50%, and most preferably about 25% to about 45% of the USRDI for zinc. The zinc compounds which can be used in the present invention can be in any of the commonly used forms such as, e.g., zinc sulfate, zinc chloride, zinc acetate, zinc gluconate, zinc ascorbate, zinc citrate, zinc aspartate, zinc picolinate, amino acid chelated zinc, and zinc oxide. Zinc gluconate and amino acid chelated zinc are particularly preferred.

Carbonation Component

Carbon dioxide can be introduced into the water which is mixed with a beverage syrup or into the dilute beverage after dilution to achieve carbonation. The carbonated beverage can be placed inot a container, such as a bottle or can, and then sealed. Any conventional carbonation methodology may be utilized to make carbonated beverage products of this invention. The amount of carbon dioxide introduced into the beverage will depend upon the particular flavor system utilized and the amount of carbonation desired.

pH

Beverage products of the present invention preferably have a pH of from about 2 to about 8, more preferably from about 2 to about 4.5, and most preferably from about 2.7 to about 4.2. Beverage acidity can be adjusted to and maintained within the requisite range by known and conventional methods, e.g., the use of food grade acid buffers. Typically, beverage acidity within the above recited ranges is a balance between maximum acidity for microbial inhibition and optimum acidity for the desired beverage flavor.

Containment Devices of the Present Invention

The present invention further relates to products which are containment devices comprising a preservative system of the present invention. As used herein and as well known in the art, "containment device" means a device which is commonly used to contain products. Such containment devices include, for example, packages, bags, bottles, cans, and boxes, particularly those intended for the containment of foods and/or beverages. Methods of incorporating the preservative system within or on the containment device are well known by those of ordinary skill in the art. As will also be understood, the containment device may have the preservative system incorporated within the device or directly coated on a surface of the device. Wherein the preservative system is coated on a surface of a device, the system is preferably coated on at least one inner surface of the device. A device may have more than one compartment within the device. Preferably, wherein the preservative system is coated on the surface of the device (and most preferably wherein the system is coated on at least one inner surface), the isothiocyanate thereof is volatile such that the isothiocyanate may permeate throughout the device, optionally through one or more inner permeable surfaces of the device. As used herein, the term "volatile" means that the respective isothiocyanate is capable of steam distillation at ambient pressure. Preferably, the isothiocyanate is capable of permeating through at least one inner permeable surface of the device. See e.g., Yamanashi Hiroo, Hei 8-266256, published Oct. 15, 1996.

Preparation of the Present Products and Methods of Preserving Products

The present invention further relates to methods of preserving a product comprising incorporating into the product:

(a) a constituent comprising one or more isothiocyanate compounds; and (b) a preservative selected from the group consisting of sorbate preservatives, benzoate preservatives, and mixtures thereof.

The present invention further relates to methods of preserving a beverage product comprising incorporating the isothiocyanate compound (and, optionally, a preservative selected from the group consisting of sorbate preservatives, benzoate preservatives, and mixtures thereof) into the beverage product.

The products of the present invention are all prepared by standard methods known in the art. For example, the beverage products of the present invention can be prepared by conventional methods for formulating noncarbonated beverages. Methods for making dilute juice beverages, for example, are described in, for example, Nakel et al., U.S. Pat. No. 4,737,375, issued Apr. 12, 1988. Methods for making beverage products are also described by Woodroof and Phillips, *Beverages: Carbonated & Noncarbonated*, AVI Publishing Co. (rev. ed. 1981); and by Thomer and Herzberg, *Non-alcoholic Food Service Beverage Handbook*, AVI Publishing Co. (2nd ed. 1978). Such methods can include hot packing or aseptic packaging operations, although such operations are not necessary for achieving either beverage stability or extended ambient display times. Indeed, an advantage of the synergistic antimicrobial combination of the present invention is that beverages containing this combination can be made without hot packing the product.

Any method that insures the present preservative system is incorporated into the product such that any microorganisms present are effectively killed or their growth is inhibited is suitable.

EXAMPLE 4

The following non-limiting example demonstrates preparation of a beverage product of the present invention. A constituent which is an essential oil, natural component thereof, or synthetic component thereof, comprising an isothiocyanate compound is prepared as set forth above. The constituent is added to a beverage product comprising a beverage emulsion prior to pasteurization. The constituent is not deliberately homogenized into the emulsion. Preferably, the constituent is soluble or dispersible in the beverage product during any phase of production. The constituent may be suspended onto, for example, microporous silicate particles, entrapped into a carrier such as maltodextrin, or concentrated into cold pressed orange oil of valencia or propylene glycol.

Analytical Methods

The isothiocyanate utilized in the present invention may be detected in, for example, an essential oil, natural component thereof, or synthetic mixture, by any of a number of methods well-known in the art. See e.g., P. D. Brown & M. J. Morris., "Glucosinolate-Containing Plant Tissues as Bioherbicides", *J. Agric. Fd. Chem.*, Vol. 43, pp. 3070–3074 (1995).

The following analytical method to determine ambient display times and microbial stability of the preservative system or finished product may be utilized to assess antimicrobial effect. This method is intended to be exemplary only, and any method to determine antimicrobial effect may be utilized.

Ambient Display Times/Microbial Stability

Ambient display times correspond to the time period during which a food product, such as a beverage product at 68° F. (20° C.) can effectively resist microbial proliferation following a 10 cfu/mL inoculation with food spoilage microorganisms. The term "microbial proliferation" as used herein means a 100 fold increase or greater in the number of food spoilage microorganisms in a food product, after an initial inoculation level of about 10 cfu/mL.

Ambient display times for food or beverage products can be determined by the following method. The product is inoculated with mixed groups of preservative resistant yeast containing at least four separate yeast isolates, including *Zygosaccharomyces bailii*, and with mixed groups of preservative resistant, acid tolerant bacteria, including Acetohacter species. All yeast and bacteria utilized in the inoculation are previously isolated from preserved fruit juice beverages. Inoculated food products are maintained at 68° F. (20° C.) for 21 days and aerobic plate cultures performed periodically. Aerobic plate counts of both yeast and bacteria populations are performed as described in the *Compendium of Methods for the Microbiological Examinations of Foods*, American Public Health Association, Washington, D.C. (edited by C. Vanderzant and D. F. Splittstoesser), which description is incorporated herein by reference. These plate counts are then used to identify the degree of microbial proliferation in the inoculated product.

EXAMPLES

The following are further non-limiting examples of beverage products prepared using the synergistic antimicrobial combination of the present invention, as well as beverage products containing only an isothiocyanate compound as the effective antimicrobial.

EXAMPLE 5

| Component | Ex. 5A % w/w | Ex. 5B % w/w |
| --- | --- | --- |
| Non Fat Dry Milk | 1.00 | 1.00 |
| Calcium hydroxide | 0.22 | 0.22 |
| Fruit acids (citric, malic, and tartaric acids) | 0.69 | 0.69 |
| Fruit juice concentrates | 0.87 | 0.87 |
| Thickeners | 0.22 | 0.22 |
| Carbohydrate sweeteners | 11.78 | 11.78 |
| Artificial and natural flavors | 0.08 | 0.08 |
| Food colors | 0.004 | 0.004 |
| Vitamins (A, C, and $B_1$) | 0.06 | 0.06 |
| Potassium Sorbate | 0.0075 (75 PPM) | 0.00 |
| Essential oil of black mustard | 0.0006 (6 PPM) | 0.0015 (15 PPM) |
| Water | q.s. | q.s. |

All of the components of Example 5 are added and mixed well to provide the juice milk beverage product.

EXAMPLE 6

| Component | Ex. 6A % w/w | Ex. 6B % w/w |
| --- | --- | --- |
| Sodium citrate | 0.09 | 0.09 |
| Citric acid | 0.52 | 0.52 |
| Vitamins (A and C) | 0.02 | 0.02 |
| Carbohydrate sweetener | 16.32 | 16.32 |
| Natural and artificial flavors | 1.14 | 1.14 |
| Thickeners | 0.12 | 0.12 |
| Oil in water emulsion | 1.66 | 1.66 |
| Potassium sorbate | 0.015 (150 PPM) | 0.00 |
| Essential oil of white mustard | 0.0004 (4 PPM) | 0.0010 (10 PPM) |
| Water | q.s. | q.s. |

All of the components of Example 6 are added and mixed well to provide the dilute juice beverage product.

EXAMPLE 7

From about 5 PPM to about 10 PPM of essential oil of white mustard is incorporated into Sunny Delight® Florida Style beverage product and Sunny Delight® plus calcium beverage product. Both products exhibit enhanced antimicrobial effect.

EXAMPLE 8

| Component | Ex. 7A % w/w | Ex. 7B % w/w |
| --- | --- | --- |
| Natural and artificial flavors | 0.27 | 0.27 |
| Tea solids | 0.25 | 0.25 |
| High Fructose Corn Syrup 55 | 7.40 | 7.40 |
| Citric acid | 0.052 | 0.052 |
| Sodium citrate | 0.078 | 0.078 |
| Aspartame | 0.013 | 0.013 |
| Caramel Color | 0.08 | 0.08 |
| Potassium sorbate | 0.015 (150 PPM) | 0.00 |
| Essential oil of black mustard | 0.0012 (12 PPM) | 0.002 (20 PPM) |
| Water | q.s. | q.s. |

All of the components of Example 8 are added and mixed well to provide the tea beverage product.

What is claimed is:

1. A product comprising:
    (a) a constituent comprising less than about 30 ppm of one or more isothiocyanate compounds; and
    (b) a preservative selected from the group consisting of sorbate preservatives, benzoate preservatives, and mixtures thereof.

2. A product according to claim 1 wherein the product is a food or beverage product and wherein the constituent is selected from the group consisting of a Cruciferae essential oil, a natural component of a Cruciferae essential oil, and a synthetic component of a Cruciferae essential oil.

3. A product according to claim 2 wherein the Cruciferae essential oil is derived from a plant selected from the group consisting of cabbage, broccoli, brussels sprout, turnip, mustard, watercress, radish, wasabi, and horseradish.

4. A product according to claim 3 wherein the plant is mustard.

5. A product according to claim 4 wherein the plant is white mustard.

6. A product according to claim 2 wherein at least one isothiocyanate compound has the structure:

wherein R is selected from the group consisting of alkyl, alkenyl, alkynyl, aryl, and alkylaryl.

7. A product according to claim 6 wherein R is selected from the group consisting of alkenyl and alkylaryl.

8. A product according to claim 7 comprising less than about 20 ppm of the isothiocyanate compound.

9. A product according to claim 8 wherein R is selected from the group consisting of allyl, 3-butenyl, and p-hydroxybenzyl.

10. A product according to claim 9 wherein R is p-hydroxybenzyl.

11. A product according to claim 8 wherein the preservative is a sorbate preservative.

12. A product according to claim 11 wherein the product is a beverage product further comprising a member selected from the group consisting of water, fruit juice, tea solids, milk solids, fruit flavors, botanical flavors, and mixtures thereof.

13. A product according to claim 12 further comprising at least one nutrient selected from the group consisting of vitamins and minerals.

14. A product according to claim 13 wherein the nutrient is selected from the group consisting of iron, zinc, copper, calcium, phosphorous, niacin, thiamin, folic acid, pantothenic acid, iodine, vitamin A, vitamin C, vitamin $B_2$, vitamin $B_3$, vitamin $B_6$, vitamin $B_{12}$, vitamin D, vitamin E, and vitamin K.

15. A product according to claim 14 wherein R is p-hydroxybenyl.

16. A product according to claim 15 wherein the sorbate preservative is potassium sorbate.

17. A product according to claim 16 comprising from about 5 ppm to about 400 ppm of potassium sorbate.

18. A beverage product comprising:
 (a) a constituent comprising one or more isothiocyanate compounds; and
 (b) a beverage member selected from the group consisting of water, fruit juice, tea solids, milk solids, fruit flavors, botanical flavors, and mixtures thereof.

19. A beverage product according to claim 18 wherein the constituent is selected from the group consisting of a Cruciferae essential oil, a synthetic component of a Cruciferae essential oil, and a natural component of a Cruciferae essential oil.

20. A beverage product according to claim 19 wherein the Cruciferae essential oil is derived from a plant selected from the group consisting of cabbage, broccoli, brussels sprout, turnip, mustard, watercress, radish, wasabi, and horseradish.

21. A beverage product according to claim 20 wherein the plant is white mustard.

22. A beverage product according to claim 19 wherein at least one isothiocyanate compound has the structure:

wherein R is selected from the group consisting of alkyl, alkenyl, alkynyl, aryl, and alkylaryl.

23. A beverage product according to claim 22 comprising less than about 30 ppm of the isothiocyanate compound.

24. A beverage product according to claim 23 wherein R is selected from the group consisting of allyl, 3-butenyl, and p-hydroxybenzyl.

25. A beverage product according to claim 23 further comprising at least one nutrient selected from the group consisting of vitamins and minerals.

26. A beverage product according to claim 25 wherein R is p-hydroxybenyl.

27. A beverage product according to claim 26 comprising less than about 20 ppm of the isothiocyanate compound.

* * * * *